May 17, 1960     R. P. SCHERER     2,936,493
METHOD OF MAKING PLASTIC CAPSULES
Filed June 16, 1955     3 Sheets-Sheet 1
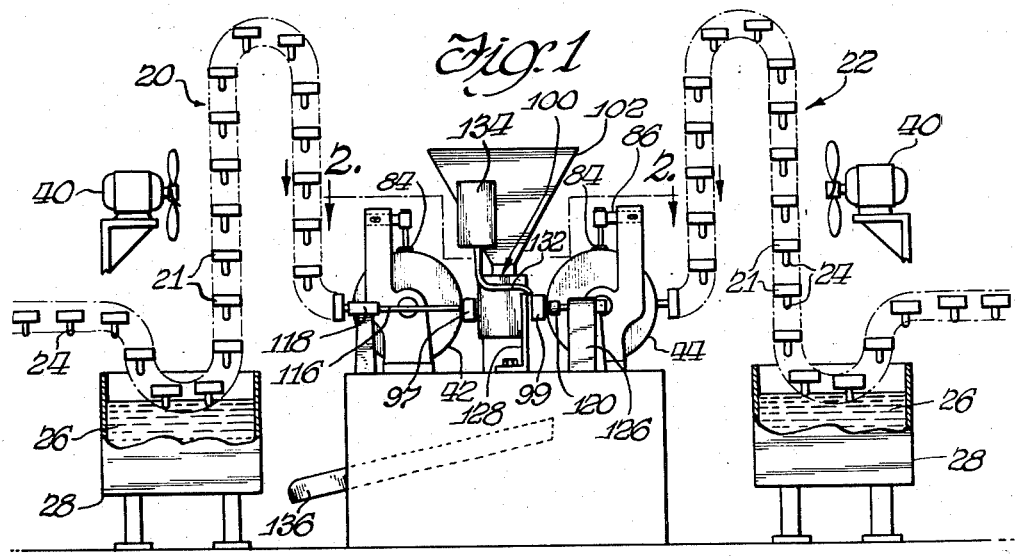
Inventor
Robert P. Scherer
by Barr, Freeman & Molinare
Attys.

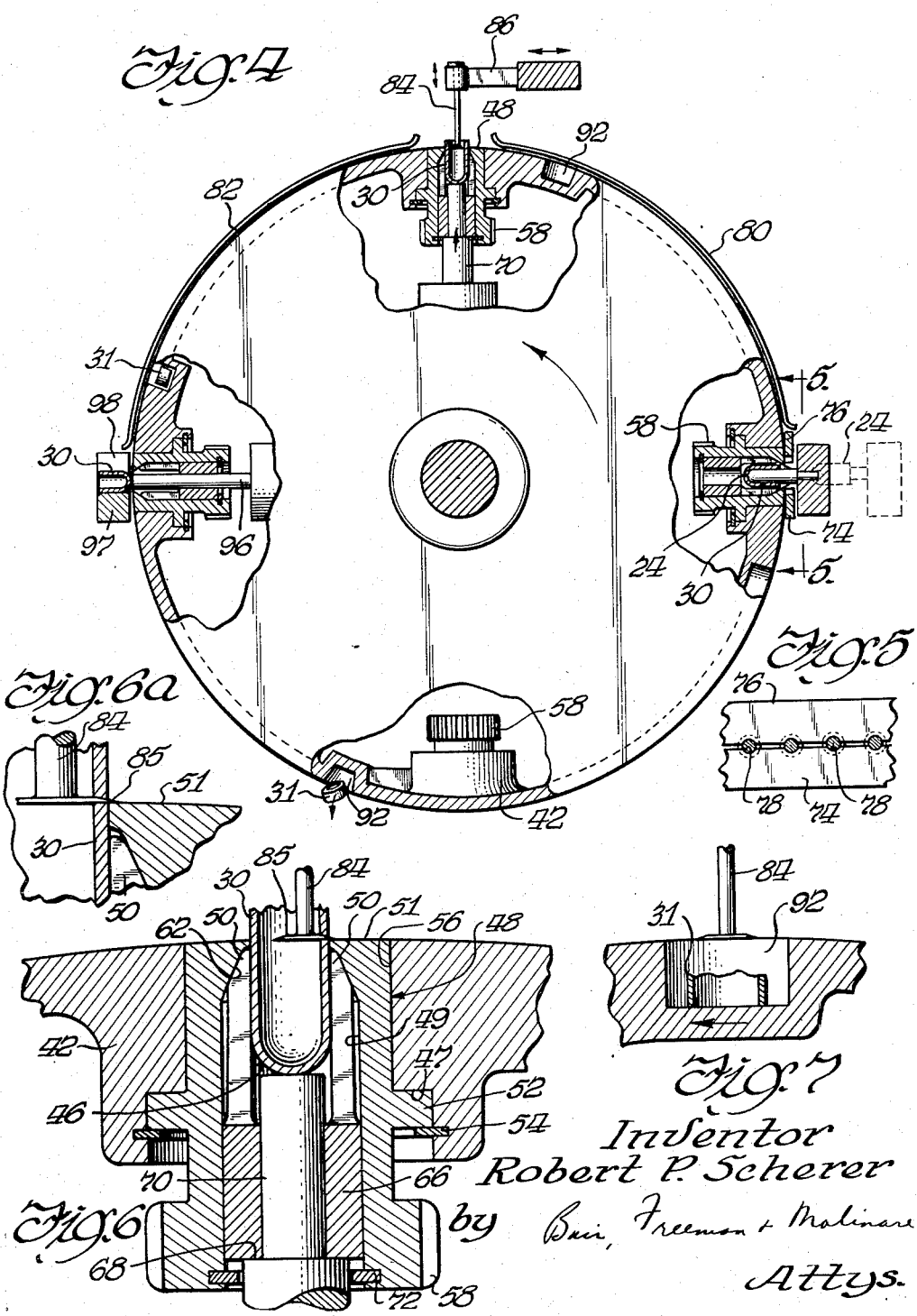

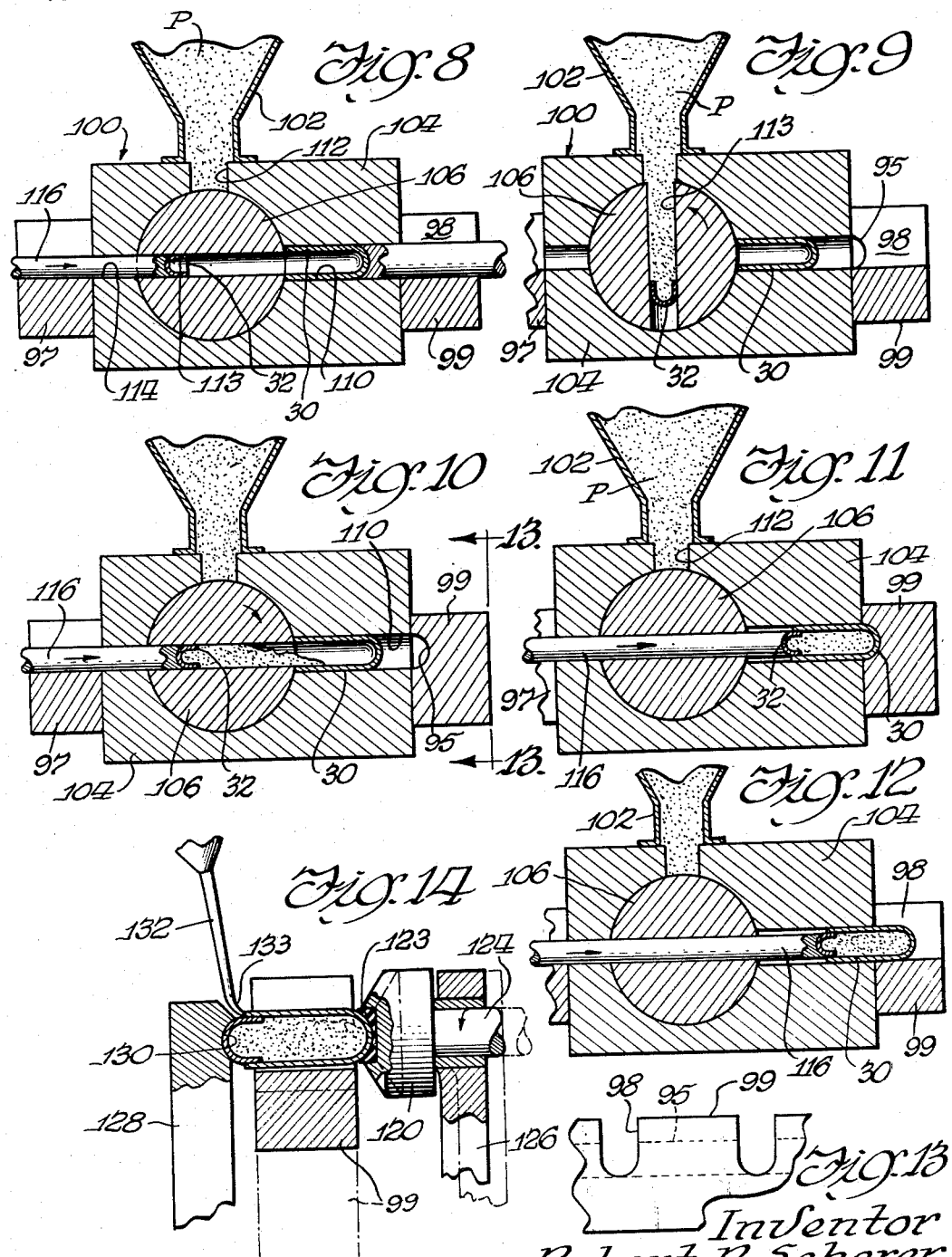

United States Patent Office 2,936,493
Patented May 17, 1960

2,936,493

METHOD OF MAKING PLASTIC CAPSULES

Robert P. Scherer, Grosse Pointe, Mich., assignor to R. P. Scherer Corporation, Detroit, Mich., a corporation of Michigan Application June 16, 1955, Serial No. 515,838

5 Claims. (Cl. 18—58.7)

This invention relates to plastic capsules which are commonly made from hard gelatin composition and used as containers for measured quantities of powders, such as pharmaceutical preparations. More particularly, the invention relates to an improved capsule construction in which the closure and body portions are not easily separated and to an improved method for preparing such capsules. Capsules of this kind conventionally are made from an elongated cylindrical open-ended body portion closed with a cap which telescopes over the open end of the body. Normally, the cap is approximately one-half as long as the body. Because the cap presents an exposed edge, it may be rather easily removed and frequently the cap becomes inadvertently displaced to spill the contents of the capsule.

The present conventional method for making plastic capsules of this type consists in dipping finger-like forms in fluid plastic composition to form a coating or film thereover, permitting the coating to harden, and stripping the hardened coating from the form. The open-ended hollow cylinder thus produced must then be trimmed to proper length for capsule bodies and caps. In automatic equipment now being employed, the cutting step is accomplished by rotating the capsule shell in a suitable chuck and bringing a cutting tool into engagement with the outside wall of the shell. This procedure results in fracturing many of the shells during trimming due to distortion thereof under the force of the cutting tool. Consequently, each shell must be rigidly inspected after trimming to make certain that if fractured, it is discarded. The necessity of inspecting each capsule greatly increases the cost of the finished capsules for a number of reasons. The inspection itself is costly, the discarded shells are costly, and the necessity for inspection prevents the shells from being automatically advanced from the trimming to the filling station and, therefore, interferes with straight-line production of filled capsules.

It is, therefore, another object of this invention to provide an improved method for trimming the fragile plastic shells which substantially eliminates the fracture problem and all of its attendant difficulties.

Other objects and advantages will become apparent from the following description when read in conjunction with the accompanying drawings, in which:

Figure 1 is an end elevation of an apparatus suitable for practicing the process of the invention;

Figure 2 is a plan view showing the entire apparatus of Figure 1;

Figure 3 is an enlarged sectional view through the novel capsule construction of my invention;

Figure 4 is a sectional view taken along the line 4—4 of Figure 2;

Figure 5 is a sectional view taken along the line 5—5 of Figure 4;

Figure 6 is a fragmentary sectional view showing the essential elements and their relationship during the trimming operation;

Figure 6a is an enlarged sectional view showing the cutting edge of the cutting implement shearing through the shell wall;

Figure 7 is a fragmentary sectional view through the surface of the cutting drum showing the strap-carrying cavity;

Figure 8 is a sectional view taken along the line 8—8 of Figure 2;

Figures 9, 10, 11 and 12 are views similar to Figure 8 illustrating the capsule filling unit at sequential stages during its operation;

Figure 13 is a sectional view of the transfer bar taken along line 13—13 of Figure 10; and Figure 14 is a sectional view through the capsule sealing portion of the apparatus.

The improved capsule construction of the invention differs from conventional capsules in that the long body portion which normally holds the charge of powder or other content has been shortened to form a stubby closure plug and the cap which normally telescopes over the open end of the body to close the capsule has been lengthened to form the body of the improved capsule. In effect, therefore, my novel capsule construction consists of an elongated body portion having its open end stoppered with a stubby hollow plug U-shaped in longitudinal cross section and having its open end extending inside the open end of the body. If desired, the interface between the plug and the shell, where the two overlap, may be invisibly sealed by means of a liquid sealing medium. This construction provides a very stable capsule since there is no cap to be accidentally pushed off. Furthermore, by reducing the distance the plug extends into the shell and maintaining the diameter of the body portion equal to the diameter of the cap of the former capsule, a larger volume is available for content. This is especially desirable in medicinal capsules for oral administration since the size of the capsule is limited to what the patient can comfortably swallow. By eliminating the long overlap or double wall formed by the telescoping cap, the volume of the capsule may be increased without increasing its overall dimensions.

The method of the invention consists first in dipping finger-like forms into fluid gelatin composition, cellulose acetate, or other suitable film-forming material. The composition is one which, upon hardening, is fragile and subject to fracture. The "hard" gelatin composition from which these capsules are made is usually prepared from a high Bloom strength gelatin containig very little or no plasticizer and in these respects differs from what is known in the trade as "soft" gelatin. The shells for the bodies and the plugs are prepared separately in pairs and are later brought together to form the completed capsule. The film deposited on the form is permitted to harden. In the case of gelatin this is acomplished by evaporating water from the composition using heat and/or conditioned air. The fragile hardened deposit, which may comprise a shell for the body or hollow plug of the finished capsule, is then stripped from the form. The shells are trimmed along a circumferential trim line to suitable length by externally supporting the shell along a line immediately adjacent to the trim line and engaging a cutting edge disposed inside the shell opposite the trim line with the inner surface of the shell. By externally supporting the fragile shell adjacent the trim line during the cutting step, fracture of the shell is completely eliminated. The trimming is accomplished by shearing action by reason of cooperation between the cutting edge and the supporting surface. There is substantially no distortion of the fragile wall of the shell by this method. Ordinary cutting, as by passing a knife edge through the shell, will frequently cause fracture. The shearing action, therefore, is important to the success of the present process.

After the shell and plug have been trimmed to desired length, the powder or other solid content of the capsule is charged into the body shell from a suitable die cavity. The die cavity has both ends open. The lower end is closed off by inserting the plug with its open end extending inwardly of the cavity. The distance the plug is inserted into the cavity determines the volume of the cavity, and in this way the volume of powder charged into the cavity may be conveniently regulated. The cavity is filled through its open end. The open end of the body shell is then placed over the open end of the cavity and force is applied to the closed end of the plug to advance it within the cavity to push the powder into the shell and to insert the plug within the end of the shell. If desired, the plug may be tapered toward its closed end so that the open end contacts the inner wall of the cavity at an angle. Hence, the powder is scraped clean from the wall as the plug acts like a plunger or piston in forcing the powder into the body portion. The body portion may also be slightly tapered. The outside diameter of the plug is equal to the inside diameter of the cavity, and fits snugly. Preferably, during this operation the body shell is externally supported to permit compressing the powder within the shell without distortion. The inside diameter of the body is equal to the inside diameter of the die cavity. The plug, therefore, fits snugly within the end of the body so that the body and plug are frictionally engaged over the contact area. A press fit of this type is usually sufficient to hold the plug in place, but in some instances it may be desirable to seal the plug within the body shell and this may be done by applying a suitable liquid sealing medium at the interface between the overlapped ends.

The capsule construction of the invention is shown in Figure 3 and consists of the elongated body portion 30 stoppered with a stubby hollow plug 32, filled with compressed powder P. The closed ends of both the body and plug are rounded, approximately hemispherical. As indicated, the plug may be tapered as shown in the drawing to facilitate stripping from the form and to improve the ability of the plug to act as a piston or plunger during the filling operation. This taper also provides improved frictional engagement with the open end of the body 30. In Figure 3, the sealing medium is indicated at 34 and serves to securely bond the overlapping contact area between the plug and the body. Preferably, the sealing medium is invisible, as for example, a solvent for the plastic material. Water is satisfactory for gelatin capsules. So far as I am aware, two-piece hard plastic capsules have never before been sealed invisibly. The customary way is to apply a separate band covering the exposed edge of the cap.

The plug 32 extends into the body a distance sufficient to permit only the hemispherical closed end to project beyond the end of the body. The center of the hemisphere lies in the plane of the end of the body. For this reason, the plug is not easily dislodged.

Referring now to the other figures of the drawing, which illustrate semi-diagrammatically and by way of example a suitable apparatus for practicing the invention, conveyors 20 and 22 carry finger-like forms 24 through a bath 26 of fluid gelatin composition in tanks 28. A plurality of forms are spaced along each bar 21 suspended from the conveyor. Preferably, the forms are tapered to facilitate removal of the shell. The conveyors follow a path which dips the end of the forms 24 into the bath 26 a predetermined distance. In Figure 1, the body shells 30 are produced on the conveyor 20 while the plug shells 32 are produced on the conveyor 22. Each conveyor moves past a suitable fan 40 for drying the gelatin to a hard fragile shell.

The conveyors carry the hardened shells, on the forms, to the first station where the shells are stripped and trimmed to desired length. The station consists of a pair of large drums 42, 44 for handling bodies and plugs, respectively. The drums have four axially-extending rows of openings 47, spaced 90° apart about the circumference of the drum. Each of the cavities 47 contains a chuck 48 for gripping the capsule shell and rotating it. The chuck 48 rotates about a circumferential flange 52 disposed within the opening 47 in the drum and held in place by means of a retainer ring 54. The bottom of the chuck has a gear 58 which meshes with similar gears on adjacent chucks in the same row. All of the chucks in one row are driven simultaneously by means of a terminal gear 60 (Figure 2) connected to a motor (not shown). As best shown in Figure 6, the opening 49 within the chuck is tapered toward its mouth, as indicated at 62. The chuck includes an internal sleeve cut into four separate segments 50 which are adapted to move axially within the opening 49 and reduce the diameter of the mouth of the chuck as they engage the tapered wall 62 to grip the gelatin shell. The segments 50 are moved upwardly within the opening 49 by means of a ring 66 which rests on the shoulder 68 of the pin 70, centrally disposed within the ring and within the opening 49. A suitable retainer ring 72 within the opening 49 permits the larger end of the pin 70 to pass therethrough, but serves to confine the ring 66 within the opening.

A plurality of pins 70 are mounted internally within the drum opposite the chucks at the top of the drum. The pins are actuated by means of a cam (not shown) so that they will move radially upward into the openings 46 within those chucks opposite the cutting station at the top of the drum, as shown in Figure 4.

As best shown in Figures 4 and 5, a pair of cooperating stripping bars 74 and 76, adapted to move toward each other, are mounted adjacent each drum near the outer sides thereof. Each bar contains semi-circular notches 78 spaced along their inner edges opposite the chucks mounted within the surface of the drum. The notches cooperate with each other when the bars are together to form circular openings which fit around the finger-like forms 24 projecting from bar 21. The forms 24, after passing through the dipping apparatus, are tilted by the conveyor into horizontal position opposite the chucks 48, and then moved laterally into the cavities 46 within the chucks. The bars 74 and 76 close over the shank of the form above the gelatin deposit. The forms then retract laterally, causing the shells to be stripped from their forms and left in the chucks. Similar stripping apparatus is mounted adjacent each drum for handling both the body shells and the plug shells.

It will be noted that the diameter of the ring 66 is smaller than the diameter of the shell disposed therein so that the shell will not fall through the opening adapted to receive pin 70 during the cutting step.

After the capsule shells have been disposed within the chucks and the forms withdrawn, the drum rotates 90° to index the chucks with the cutting implement 84 mounted adjacent the top of the drum. It will be understood that although there are two drums and a plurality of chucks in each drum, the structure of only one drum, chuck or cooperating part will be described as a matter of convenience, since they are alike in construction. Suitable power means (not shown) is provided to rotate the drum. A shield 80, spaced from the face of the drum and extending through the 90° arc from the side to the top position, serves to confine the gelatin shells within the cavity of the chuck as the drum rotates. The chuck is open during the period of drum rotation. The shell is now ready for trimming and the pin 70 moves up into the chuck opening 46 a predetermined distance as determined by the cam which actuates the pin. As the shoulder 68 on the pin engages the underside of the ring 66, the segments 50 within the opening 49 of the chuck bear against the tapered wall 62 and grip the shell 30. The distance the shell 30 extends above the end of the chuck is determined by the small-diameter length of the pin 70 extending above the shoulder 68. The longer this portion of the pin, the shorter the trimmed shell. A series of cutting implements 84 are rotatably mounted on arms 86 extending from bars 88 and 90, each aligned with the center of a chuck. A suitable cutting blade 85, preferably round, is mounted on the lower end of each implement. Implement 84 is adapted to move down into the open end of the shell with the cutting edge 85 just above the outer end 51 of the chuck. Thus, the trim line is immediately above the end of the chuck, which provides circumferential external support for the shell during trimming. The bars 88 and 90 on which the cutting implements are mounted are also adapted to move the blades 85 laterally to the position shown in Figure 6a for the purpose of shearing the fragile plastic or gelatin wall of the shell at the trim line. The chuck is adapted to rotate during the cutting operation so that the shearing is completed around the entire circumference of the shell. The chuck, it will be noted, provides complete support for the shell so that there is no distortion of the shell as the cutting edge bears against the wall thereof. Preferably, the cutting implement is adapted to rotate freely to present a fresh edge continually, thus keeping the tool sharp for a longer period of time. However, the cutting implement may be of other suitable construction for severing the top of the shell by shearing action.

Upon completion of the trimming operation, the pin 70 and the cutting implement 84 retract. The drum indexes with the next station by rotating through 90°. The portion 31 trimmed from the top of the shell 30 falls into a cavity 92 provided in the face of the drum adjacent each chuck so that this scrap material is carried away. A shield 82, like shield 80, is disposed over the surface of the drum between the top and left side stations covering an arcuate extent of 90° to prevent the trimmed shell and the scrap portion 31 from being thrown out of the cavity as the drum rotates. At the third station, the trimmed shell 30 is pushed out of the cavity 46 by means of pins 96 which move radially outwardly from the center of the drum, being actuated by the cam which actuates the pin 70. The shells 30 are pushed into grooves 98 provided therefor in the face of transfer bars 97, 99 (Figure 2) mounted adjacent the drums. Bars 97, 99 are adapted to reciprocate axially to move the trimmed shells to the filling unit designated generally by the numeral 100. The bar 99, carrying body shells 30, moves from the drum 44 toward the filling station while the bar 97, carrying plug shells 32, moves from the drum 42 toward the filling station so that in final position one is disposed on each side of the central filling unit.

The filling unit comprises a long block 104 of rectangular cross section (Figures 8 through 12) having a rotatable cylinder 106 disposed therein. Cylinder 106 has a plurality of die cavities 113 extending completely therethrough, and spaced along its length. There is one die cavity for each finished capsule. The die cavity 113 has an inside diameter equal to the outside diameter of the plug shell 32, but smaller than the outside diameter of the body 30. Three openings 110, 112 and 114 are drilled radially through the block and are spaced 90° from each other. The opening 110 is adapted to receive the body shell 30 from the bar 99 and the opening 114 is adapted to receive the plug 32 from bar 97 on the other side of the block. The opening 112, normal to the coaxial openings 110 and 114, connects with a hopper 102 extending lengthwise of the block 104. The hopper 102 is adapted to hold powder P, or other contents, which is to be capsulated. Mounted adjacent the block outside of the bars 97, 99 are laterally reciprocating bars 118 and 122 which carry horizontal pins 116 and 121, respectively. These pins are adapted to push the shells from the grooves 98 within the bars 97, 99 into the cavities 114 and 110 in the block 104. The pins 116 are of sufficient length to extend completely through the block.

In operation, the pins 116, 121 move simultaneously to push the plugs 32 and bodies 30 into cavities 114 and 110, respectively. During the first step of the filling operation the die opening 113 is aligned with openings 110 and 114. Since the die cavity 113 is of smaller diameter than the body 30, the body 30 must stop when it strikes the marginal portion of the cylinder 106 surrounding the die cavity 113. The plug portion, however, being of approximately the same diameter as the die cavity 113, is inserted within the die cavity to a predetermined distance. This distance determines the volume of the die cavity 113 and, consequently, the volume of powder to be capsulated. The pin 116 then retracts and the cylinder 106 rotates in a counter-clockwise direction, when viewed as in Figures 8 and 9, so that the die cavity 113 is aligned with the opening 112 leading to the hopper 102. The powder then falls by gravity into the die cavity 113, as shown in Figure 9, filling the entire cavity and the stubby hollow plug 32. The cylinder 106 then rotates in a clockwise direction through an angle of 90° so that the opening 113 is aligned with openings 114, 110. The pin 116 then re-enters the cavity 113 and engages the rounded end of the plug, which acts as a piston within the die cavity 113, to push all of the powder therein into the body shell 30 disposed within the opening 110. The transfer bar 99, by which the body shells were moved from the trim unit to the fill unit, then moves a distance of one-half the space between transverse grooves 98 so they are no longer in alignment with the pins 120. This brings the grooves 95 in the face of bar 99 and between grooves 98, into alignment with the opening 110 in the block 104. When the pin 116 causes the capsule to be filled with powder and pushes the plug into the end of the body, the capsule tends to move out of the cavity 110, whereupon the outer end of the body engages the groove 95 in bar 99, which serves as a stop. Thus, the capsule is held in the opening 110 and is completely confined externally, except for the very end. Confinement permits the power to be subjected to considerable pressure by application of force through the pin 116.

The bar 99 then shifts back to its original position with grooves 98 aligned with openings 110, and the pin 116 pushes the finished capsule into the groove, as shown in Figure 12.

If desired, the plug may be sealed within the body by applying a suitable liquid sealing medium. The portion of the apparatus for accomplishing this is shown in Figure 14 and consists of a rotatable disc 120 having a rubber-lined cavity 123 disposed in one end thereof adapted to engage the end of the capsule body, which extends beyond the side of the bar 99. A series of these discs, one for each capsule, is mounted on shafts 124 disposed in bearings within the bar 126, which moves laterally to bring the discs 120 into engagement with the ends of each of the capsules disposed within their grooves 98 in the bar 99. The opposite or plug end of the capsule is engaged by another bar 128 having a suitable depression 130 therein for engaging the rounded end of the plug. As the disc 120 is rotated, the capsule is rotated. A suitable conduit 132 connecting to a source of liquid sealing medium in reservoir 134 has a tapered end 133 which terminates at the interface between the body and the plug. The liquid sealing medium may be a siutable solvent which, to some extent, dissolves and tackifies the outer layer of the capsule wall, or it may be a liquid adhesive. By touching the sealing medium to the end of the body portion adjacent to the plug, the liquid flows by capillarity into the area of contact between the plug and the body, thus forming a seal. Where solvent is used, the seal is invisible. The adhesive may also be prepared as an invisible composition. The capsule may be rotated through two or three revolutions to insure an adequate amount of liquid sealing medium being deposited.

After the capsules have been engaged by the plates 120 and 128, the carrier bar 99 moves out from under the capsules. Consequently, after the sealing operation, the capsules will fall as soon as the plates 120 are moved out of engagement with the end thereof. A suitable chute 136 is provided to catch the capsules and direct them to the inspection and packing stations.

From the foregoing description it is apparent that I have provided a process which is admirably suited for continuous production of filled plastic capsules, and which requires no intermediate visual inspection. Modifications in the steps described will be apparent to those skilled in the art without departing from the true spirit of my invention. It is, therefore, my intention not to limit the invention other than as necessitated by the scope of the appended claims.

What I claim as new and desire to secure by Letters Patent of the United States is:

1. A method for trimming a hollow cylindrical shell, having one open end, along a circumferential trim line, said shell being made from fragile plastic material, which comprises inserting a cutting implement into said open end with its cutting edge opposite the trim line, supporting the shell along a line adjacent the trim line, bringing the implement into engagement with the inner surface of the shell while rotating the shell to sever the portion above the trim line by shearing action without fracturing the shell.

2. The method of claim 1 wherein said cutting implement rotates freely while engaged with said shell wall.

3. The method of preparing from fluid plastic material a tubular plastic shell having one closed end which comprises dipping finger-like forms into the fluid plastic, permitting the plastic to harden on the form to a fragile shell, stripping the shell directly from the form into a rotatable chuck with the open end of the shell projecting a predetermined distance above the end of the chuck, rotating the chuck, bringing a cutting edge into engagement with the inside surface of the shell just above the end of the chuck to sever the projecting portion by shearing action and without fracturing the shell.

4. The method of claim 3 wherein said cutting edge rotates freely while engaged with said shell wall.

5. The method of preparing from fluid plastic material a tubular plastic shell having one closed end which comprises dipping finger-like forms into the fluid plastic, permitting the plastic to harden on the form to an easily fracturable shell, stripping the shell directly from the form into a rotatable chuck with the open end of the shell projecting a predetermined distance above the end of the chuck, inserting a cutting implement having a cutting edge on the lower end thereof into the open end of the shell, moving the implement laterally into engagement with the inside surface of the shell just above the end of the chuck to sever the projecting portion without fracturing the shell.

References Cited in the file of this patent

UNITED STATES PATENTS

| | | |
|---|---|---|
| 555,021 | Richard | Feb. 18, 1896 |
| 961,936 | Colton et al. | June 21, 1910 |
| 1,627,169 | Gangler | May 3, 1927 |
| 1,774,258 | English | Aug. 26, 1930 |
| 1,967,153 | McCreary | July 17, 1934 |
| 2,025,029 | Ford | Dec. 24, 1935 |
| 2,230,849 | Salfisberg | Feb. 4, 1941 |
| 2,323,582 | Weckesser | July 6, 1943 |
| 2,412,637 | Smith | Dec. 17, 1946 |
| 2,624,164 | Donofrio | Jan. 6, 1953 |
| 2,630,953 | Kath | Mar. 10, 1953 |
| 2,742,749 | McGuire | Apr. 24, 1956 |

FOREIGN PATENTS

| | | |
|---|---|---|
| 600,153 | Great Britain | Apr. 1, 1948 |